April 7, 1931.  C. W. A. TAYLOR  1,799,935

PULLEY BLOCK

Filed Feb. 21, 1930   2 Sheets-Sheet 1

Inventor:
Charles William Alexander Taylor
By
Pennie Davis Marvin & Edmonds
attorneys April 7, 1931.   C. W. A. TAYLOR   1,799,935
PULLEY BLOCK
Filed Feb. 21, 1930   2 Sheets-Sheet 2

Inventor:
Charles William Alexander Taylor
By
Pennie Davis Marvin & Edmonds
attorneys Patented Apr. 7, 1931

1,799,935

UNITED STATES PATENT OFFICE

CHARLES WILLIAM ALEXANDER TAYLOR, OF CORBRIDGE-ON-TYNE, ENGLAND

PULLEY BLOCK

Application filed February 21, 1930, Serial No. 430,242, and in Great Britain October 19, 1929.

This invention relates to pulley blocks, and has for its primary object the provision of means for effecting lubrication of the wearing faces of the sheave or sheaves and the pin whereon the sheave or sheaves is or are journalled.

For convenience of description, the pulley block will be hereinafter referred to as comprising a single sheave interposed between side straps and journalled on a pin secured to said side straps.

A pulley block according to the invention comprises a sheave journalled on a pin provided, on the side remote from that which is exposed to the pressure transmitted by the sheave, with a trough which serves as a reservoir for lubricant and also as a gutter for distributing lubricant on to the bearing surfaces of the pin and the orifice in the sheave, the trough being accessible from the exterior of the block so as to permit filling and replenishment of the reservoir without dismantling the block.

Figure 1:
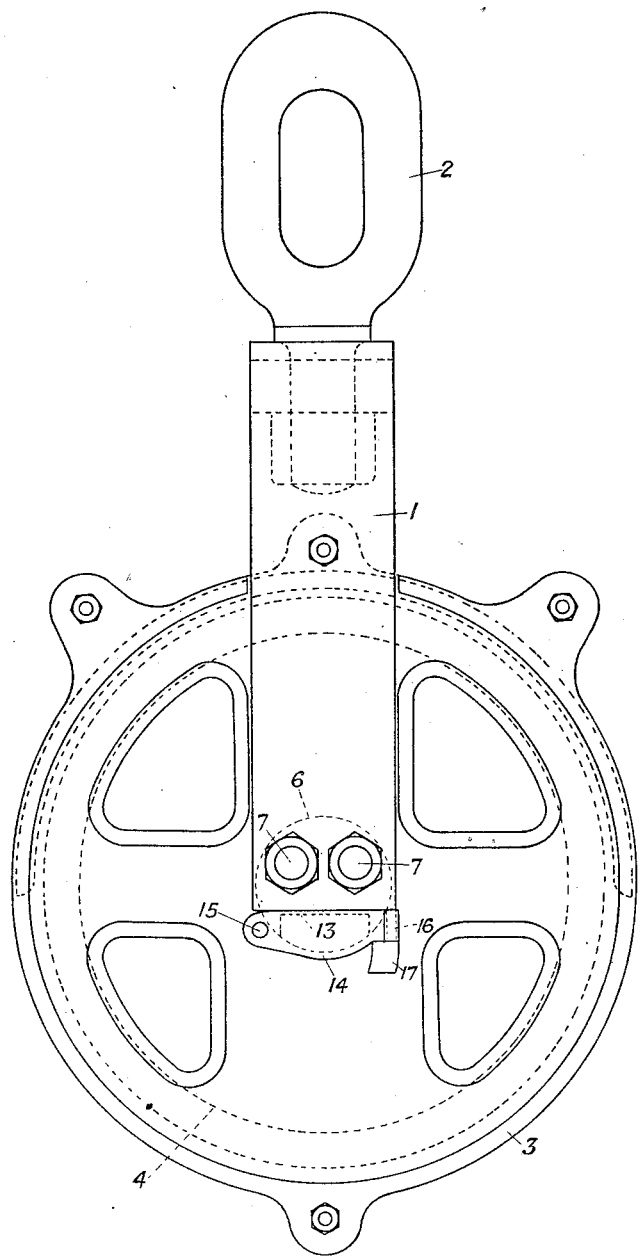
Figure 2:
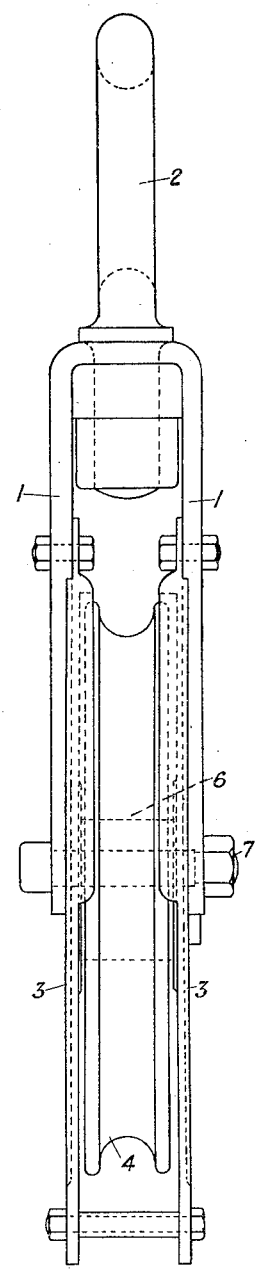
Figures 5, 6:
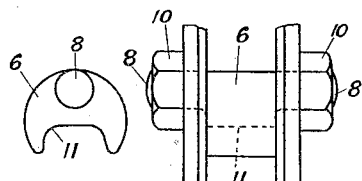
Figures 3, 4:
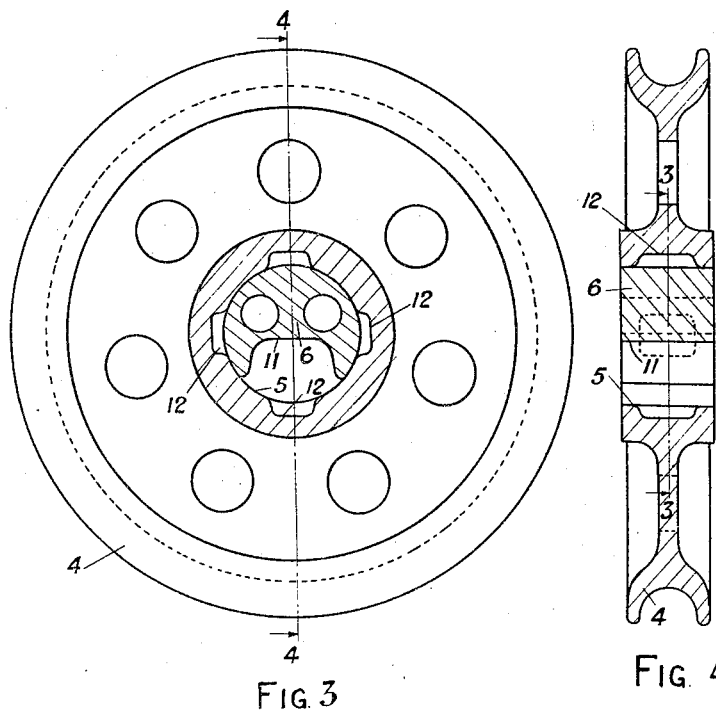

In the accompanying drawings Fig. 1 is a side elevation of a pulley block constructed in accordance with the invention, Fig. 2 a side elevation, Fig. 3 is a part elevation, part section substantially on the line 3—3 of Fig. 4, Fig. 4 a section on the line 4—4 of Fig. 3. Fig. 5 is a fragmentary side elevation of a modified form of pin and Fig. 6 an end elevation of said pin.

The pulley block shown comprises a binder 1 suspended from the usual eye 2, the binder being under tension. Within the binder is fitted a shell 3 and within the shell is mounted a sheave 4. The sheave 4 presents a bearing surface 5 journalled on a sheave-supporting pin 6 which, in the form illustrated in Figs. 1, 2 and 3 is secured to the binder 1 by bolts 7 penetrating apertures in the pin, shell and binder. In the form illustrated in Figs. 5 and 6 the pin 6 is formed with screw-threaded necks 8 penetrating apertures in the shell and binder, the necks 8 being engaged by nuts 10 disposed externally of the binder.

It will be seen that, when the sheave 4 is loaded, the pressure transmitted by the sheave to the pin 6 is on the side of the pin nearest the eye 2.

Formed in the pin 6 on the side remote from the eye 2 is a trough 11 which constitutes a lubricant reservoir, the reservoir being of substantial dimensions and being so arranged that lubricant contained in the reservoir is actually lying on the bearing surface 5. Thus, the bearing surface 5 is effectively lubricated and, on rotation of the sheave, the lubricant is carried round the pin 6. In the form illustrated in Figs 3 and 4 the bearing surface 5 is formed with lubricant-receiving pockets 12.

For the purpose of gaining access to the reservoir, when the reservoir is to be filled or replenished, there is formed in the shell 3 opposite the reservoir a door-way 13 which is normally closed by a door 14 pivotally mounted at 15 on the shell and provided with a latch 16 engageable with a step 17 on the shell.

I claim:

In a pulley block, in combination, a binder, a shell within said binder, at least one sheave located within said shell and provided with a plurality of lubricant pockets, a sheave-supporting pin secured to said binder and presenting a journal for said sheave, said pin being exposed on one side to the pressure transmitted by said sheave and a lubricant reservoir constituted as a trough positioned on the opposite side of said pin and directly accessible for filling and replenishing from the exterior of said shell, said trough being in communication with said pockets.

In testimony whereof I have signed my name to this specification.

CHARLES W. A. TAYLOR.